Sept. 26, 1967   A. L. FREEDLANDER ET AL   3,343,350
LAWN MOWER BLADE
Filed Sept. 14, 1966
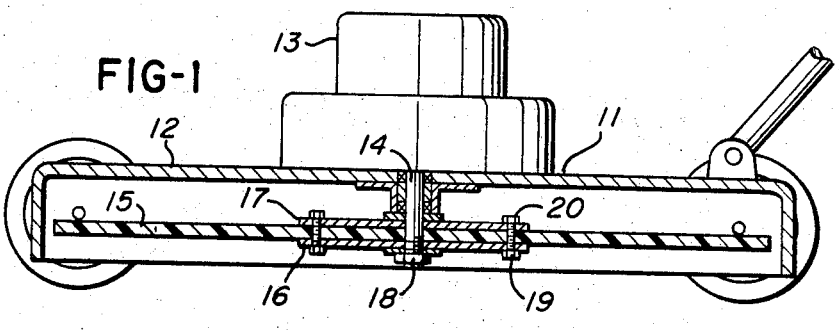
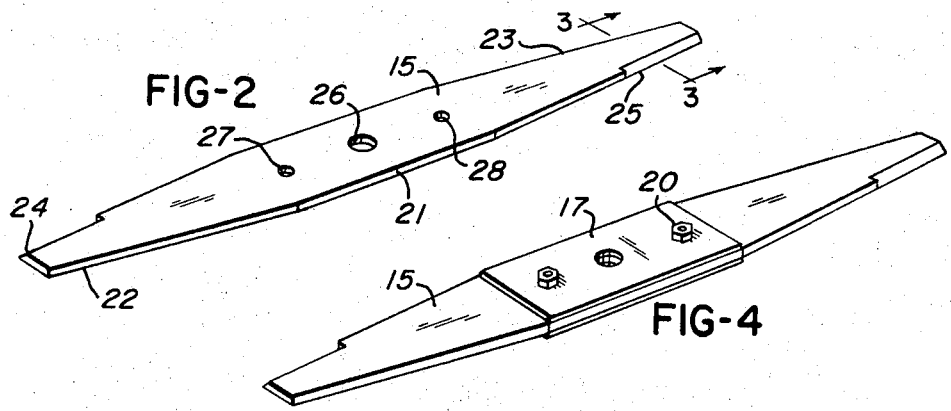
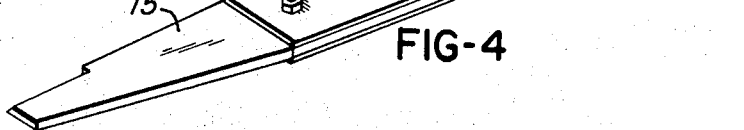
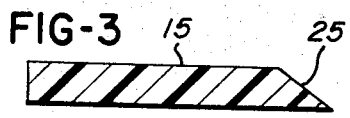
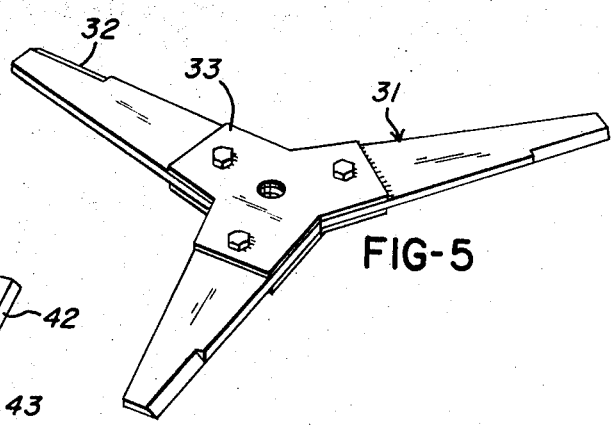
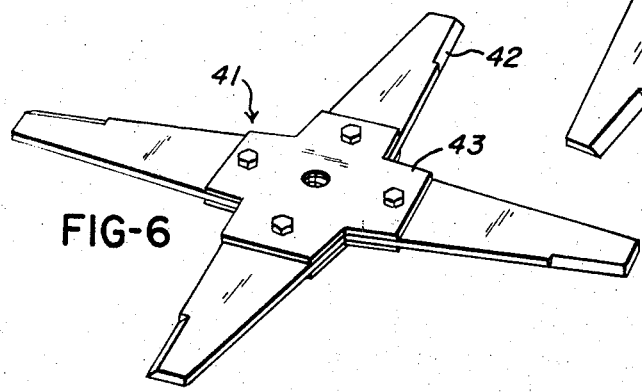
INVENTORS
ABRAHAM L. FREEDLANDER
ROBERT E. MATTHEWS
WAYNE C. GARRETT
BY
Reuben Wolk
ATTORNEY

# United States Patent Office 3,343,350
Patented Sept. 26, 1967

3,343,350
LAWN MOWER BLADE
Abraham L. Freedlander, Dayton, Ohio, and Robert E. Matthews and Wayne C. Garrett, Waynesville, N.C., assignors to Dayco Corporation, Dayton, Ohio, a corporation of Delaware
Filed Sept. 14, 1966, Ser. No. 579,304
10 Claims. (Cl. 56—295)

ABSTRACT OF THE DISCLOSURE

A flexible elastomeric lawn mower blade adaptable for mounting on a power driven rotary lawn mower. The blade is designed for safety as the material permits it to flex when striking a shoe and thus avoids serious injury, and also has other advantages due to its flexibility. The blade is made entirely of elastomeric material such as urethane and requires no internal reinforcement.

---

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation, of the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if a immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and very low in cost.

It is, therefore, a principal object of this invention to provide a lawn mower blade that minimizes the possibility of personal injury.

It is a further object to provide such a blade which is inexpensive and simple to manufacture.

It is a further object to provide a blade which retains its cutting edge for a long period of time.

It is another object of the invention to provide a blade with multiple cutting arms which retain their elastomeric properties throughout their life.

Other objects of the invention will be readily apparent in the following description and as shown in the accompanying drawings, in which:

FIGURE 1 is a side elevational view of a typical lawn mower, in partial section.

FIGURE 2 is a perspective view of a novel blade in accordance with the invention.

FIGURE 3 is a cross section of the blade taken along lines 3—3 of FIGURE 2.

FIGURE 4 is a view similar to FIGURE 2 showing the novel blade with an adapted attached.

FIGURES 5 and 6 are views similar to FIGURE 4 illustrating other forms of the invention.

Referring now to the drawings, FIGURE 1 illustrates a conventional lawn mower 11 having a housing 12 upon which is mounted a motor 13 having a shaft 14 extending downwardly through the housing. Mounted on the shaft is the blade 15 which is actually secured by the use of a pair of adapters 16 and 17 which may be made of metal or rigid plastic material. The shaft 14 extends through the blade and adapters and is secured thereto by means of a nut 18. The blade and adapters are assembled by means of screws 19 and 20.

The blade 15 is shown in FIGURE 2 is made of a single layer of material, and has a central portion 21 with a maximum width in the region of the center, tapering inwardly to its outer edges and terminating in two arms 22 and 23. At this point the edge portions are approximately one-half the width of the central portion. The outermost edge portions designated at 24 and 25 are beveled at one side as shown in FIGURE 3, providing a sharpened edge for cutting. However, it is also possible to bevel both the leading and trailing edges to permit the blade to be turned upside down and used in the opposite direction as well. It is also possible to bevel the sharpened edge in the opposite direction from that shown. A central aperture 26 is used for mounting on the shaft and smaller mounting holes 27 and 28 located within the central portion are used for mounting to the adapters as shown.

It has been proposed in the prior art to use flexible or elastomeric materials as, for example, illustrated in the patent to Tatum No. 3,133,398 and the patent to Voigt No. 3,104,510. In both of these cases the inventor primarily contemplated rubber materials, but included additional material to avoid undesirable elongation of the elastomer, and to provide stiffness thereto. For example, Tatum utilized a wire screen or small particles such as stones in order to maintain the integrity of the body. Voigt included fabric layers for the same purpose. Applicants, however, have found that unexpectedly high results can be obtained by certain types of elastomeric materials without the necessity of adding wire screens, particles, fabric, or cords, and as a result the present invention contemplates a non-reinforced blade which is composed entirely of a flexible elastomeric material and has no other material included. A preferred material is a urethane elastomer of the type which is adapted to be cast and which is formulated from a polyester based isocyanate terminated prepolymer. This material is formed through a chain extension with selected polyols or other polyfunctional active hydrogen materials and has been found to provide the necessary physical and mechanical characteristics. The material may be used in a wide range from 90 Shore A to 70 Shore D and has the following characteristics:

Hardness: 90–95A; 50–55D; 65–70D.
Tensile strength, p.s.i.: 4000–5000; 5000–6000; 3500–4500.
Tear strength, p.l.i.: 300–400; 600–700; 500–650.

A successful lawn mower blade should have a minimum of elongation, in order to reduce stress, minimize abrasion, reduce flutter, and prevent the blade from striking the housing. The material described above has a very low elongation; for example, a lawn mower blade 19 in. long has been found to elongate only ¾ in. during operation at 3600 r.p.m., thus giving us an elongation of less than five percent. This material also has excellent elastic memory; so that the blade will always return to its initial length after conclusion of the operation. The blade manufactured of this material will thus have sufficient structural integrity to provide the necessary job of cutting the grass, and yet will have sufficient flexibility to yield when striking extraneous objects such as a shoe, a rock, or a post, and will both glide over the object and have a certain amount of cushioning effect so that neither the object nor the blade will be damaged. It is important to remember that this is accomplished without the use of any reinforcing materials whatsoever so that the blade is completely homogeneous. Of course, it is possible to add reinforcing materials such as fabric or cords, if extra stiffness is desired.

FIGURE 4 illustrates the assembly of one of the adapters 17 with the blade 15, and it is noted that the adapter is mounted on the blade by means of the screws and is long enough to extend over the central portion of the blade. It has been found that for best results the adapter should extend for about 40 to 50 percent of the overall length of the blade. This provides additional support for the blade so that it will not flex excessively when striking an object and yet will not be so long as to interfere with the necessary flexibility of the blade.

FIGURE 5 illustrates a modification of the invention in which the blade 31 is formed with three equi-angular arms 32 which are formed like the arms 22 and 23. The adapter 33 is mounted over the central portion of the blade to provide additional support without seriously affecting the flexibility. The blade is fabricated from material similar to that described above and performs similar results.

FIGURE 6 illustrates a still further form of the invention wherein the blade 41 is formed of four arms 42 which are similar in construction to the arms of the other blades. The adapter 43 performs the same function for this blade as for the others.

It is obvious that there is no specific limitation as to the number of arms to be used, the exact number being dictated by the type of grass which may be cut. Regardless of the number of arms, however, the blade will still provide the necessary function of safety as well as thorough cutting due to its flexible elastomeric nature.

The invention described above provides for the first time a grass cutting blade in which the material is essentially a homogeneous, flexible elastomeric material, capable of supporting loads without internal reinforcement. While it is normally made of a single layer, it might also be composed of multiple layers that are permanently joined.

We do not intend to be limited to the specific examples described, but contemplate other forms of the invention which fall within the scope thereof.

We claim.

1. In a lawn mower having a rotatable shaft and a cutting blade mounted on said shaft, said blade composed entirely of a flexible urethane elastomer material.
2. The blade of claim 1 in which said material is a cast urethane elastomer formulated from a polyester based isocyanate terminated prepolymer.
3. The blade of claim 1 in which said material has a hardness ranging from 90 Shore A to 70 Shore D.
4. The blade of claim 1 in which said material has a longitudinal elongation of less than five percent during rotation.
5. The blade of claim 1 in which said material is a cast urethane elastomer formulated from a polyester based isocyanate terminated prepolymer having a hardness ranging from 90 Shore A to 70 Shore D and a longitudinal elongation of less than five percent during rotation.
6. The blade of claim 1 in which said blade has edge portions approximately one-half the width of the central portion.
7. The blade of claim 1 having a plurality of outwardly extending equi-angular spaced arms.
8. The blade of claim 7 in which said arms taper inwardly toward their outer extremities.
9. The blade of claim 8 in which one edge of each of said extremities is beveled to provide a cutting surface.
10. In a lawn mower having a rotatable shaft, a cutting blade assembly comprising a flexible urethane elastomer blade and at least one relatively thin rigid reinforcing member mounted on at least one non-cutting surface thereof, said member being about 40 to 50 percent of the length of said blade.

References Cited
UNITED STATES PATENTS

| | | | |
|---|---|---|---|
| 2,657,517 | 11/1953 | Berdan | 56—295 |
| 2,854,807 | 10/1958 | Byler et al. | 56—295 |
| 2,869,311 | 1/1959 | Beeston | 56—295 |
| 3,156,082 | 11/1964 | Joyner | 56—295 |

OTHER REFERENCES

Processing Methods for Texin, Mobay Chemical Co., pp. 2 and 3, copyrighted 1964.

Technical Data on Plastics, Manufacturing Chemists Assoc. Inc., p. 94, published February 1957.

ABRAHAM G. STONE, *Primary Examiner.*

P. A. RAZZANO, *Assistant Examiner.*